(12) United States Patent
Gerber

(10) Patent No.: US 7,347,126 B2
(45) Date of Patent: *Mar. 25, 2008

(54) CLAMPING SYSTEM FOR THE TOOL HOLDING FIXTURE OF MACHINE TOOLS

(75) Inventor: Ernst Gerber, Reigoldswil (CH)

(73) Assignee: Rego-Fix AG (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/599,754

(22) Filed: Nov. 15, 2006

(65) Prior Publication Data

US 2007/0074609 A1   Apr. 5, 2007

Related U.S. Application Data

(63) Continuation of application No. 10/353,537, filed on Jan. 29, 2003, now Pat. No. 7,152,510.

(30) Foreign Application Priority Data

Feb. 1, 2002   (CH) ................... 0171/02

(51) Int. Cl.
B25B 13/56   (2006.01)

(52) U.S. Cl. .................. 81/176.15

(58) Field of Classification Search .......... 81/176.15, 81/186, 124.2, 125.1, 176.2, 461
See application file for complete search history.

(56) References Cited

U.S. PATENT DOCUMENTS

| 2,830,480 | A | 4/1958 | Brame |
|---|---|---|---|
| 4,339,971 | A | 7/1982 | Zatorre |
| 5,996,447 | A | 12/1999 | Bayouth |
| 6,282,989 | B1 | 9/2001 | Sorter |
| 6,779,424 | B2 | 8/2004 | Schmidt |
| 7,152,510 | B2 * | 12/2006 | Gerber .......... 81/176.15 |
| 2001/0022118 | A1 | 9/2001 | Zollmann |
| 2003/0145691 | A1 | 8/2003 | Gerber |
| 2004/0149090 | A1 | 8/2004 | Whitehead |
| 2005/0016330 | A1 * | 1/2005 | Stahnke .......... 81/176.15 |

FOREIGN PATENT DOCUMENTS

| DE | 29608677 U1 | | 9/1999 |
|---|---|---|---|
| DE | 29907998 U1 | | 9/1999 |
| FR | 1011832 | * | 6/1952 |
| FR | 2585609 A1 | * | 2/1987 |
| FR | 2761630 A1 | * | 10/1989 |
| SU | 500053 | * | 1/1976 |

* cited by examiner

Primary Examiner—Lee D. Wilson
(74) Attorney, Agent, or Firm—Hoffman & Baron, LLP

(57) ABSTRACT

The non-slip system consists of screw connection elements or screw closure elements with cams or grooves (4) on the face, and of a spanner (13), also provided with cams (16, 17, 18), for tightening and loosening them. The side flanks (8, 9) of the cams or grooves have an S-shaped profile.

7 Claims, 4 Drawing Sheets

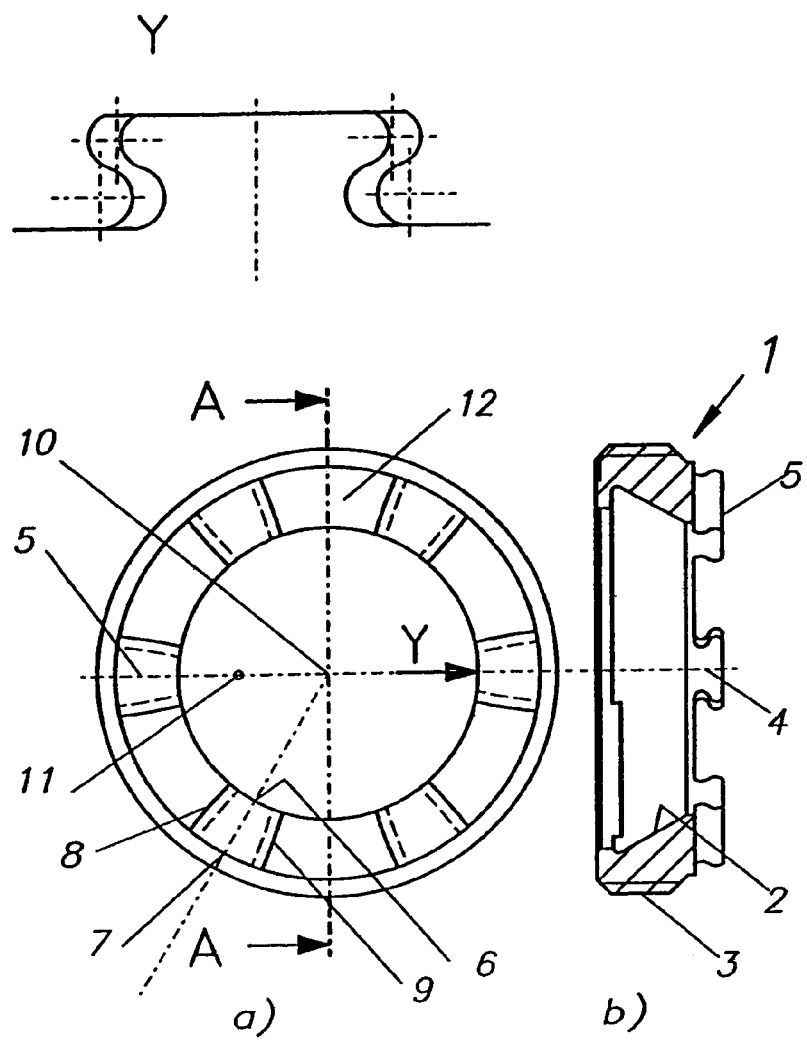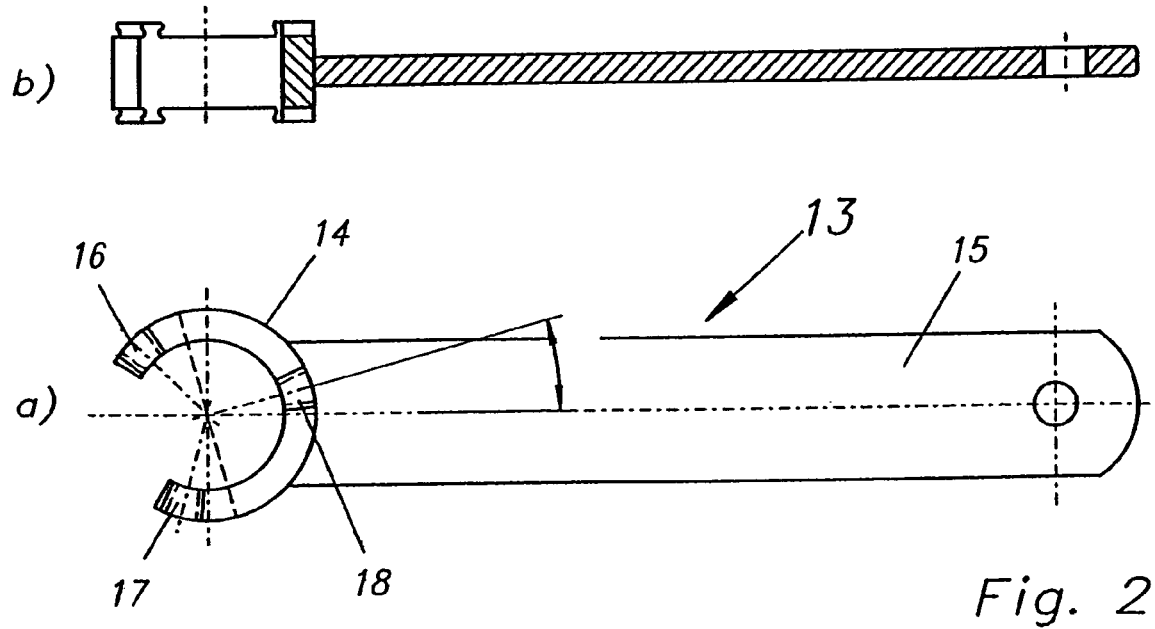
Fig. 1
Fig. 2

CLAMPING SYSTEM FOR THE TOOL HOLDING FIXTURE OF MACHINE TOOLS

CROSS-REFERENCE TO RELATED APPLICATIONS

This application is a continuation of U.S. Application Ser. No. 10/353,537, filed Jan. 29, 2003 now U.S. Pat. No. 7,152,510, which claims priority to CH0171/02, filed Feb. 1, 2002, all of which are incorporated herein by reference.

BACKGROUND OF THE INVENTION

The present invention relates to a non-slip system consisting of screw connection elements or screw closure elements with cams or grooves on the face, and of a spanner, also provided with cams, for tightening and loosening them. Within the framework of this patent application, screw connection elements are understood as meaning screws and nuts. The term is specifically intended to include tension nuts for clamping tool shanks in a tool holding fixture of a machine tool by means of a collet chuck. Screw closure elements are understood as meaning screwed-on or screwed-in covers, screw lids and the like.

DE 299 07 998 U discloses a system in which the tension nut is provided with radial grooves of dovetailed cross-section on the face, in which a spanner with pins or cams, also of dovetailed cross-section, engages for tightening and loosening the tension nuts. The dovetail connection between spanner and tension nut is intended to prevent the spanner from accidentally slipping during the clamping process.

One disadvantage of the dovetailed cross-section of the grooves and cams is the high notch effect in the corners and the resultant risk of damaging the cams or even breaking them off the spanner or parts of the nut. A further disadvantage is that pieces of the operator's clothing can get caught on the sharp edges or the operator can be injured.

SUMMARY OF THE INVENTION

The object of the invention is therefore to find a solution to this problem and to provide a clamping system that does not exhibit these disadvantages.

This object is achieved according to the invention by giving the side flanks of the cams or grooves on the face an S-shaped profile. Within the framework of this patent application, S-shaped is understood as meaning a profile which, in contrast to the Z-shaped so-called dovetail profile, essentially consists of two parts curved in opposite directions and fitting together homogeneously, it being possible either for the two curvatures to mate directly or for there to be a narrow flat intermediate region between the curved surfaces.

Preferred examples of the invention are described below with the aid of the attached drawings.

BRIEF DESCRIPTION OF THE DRAWINGS

FIG. 1 shows a tension nut with six cams as a) an axial top view, b) a section along the line A-A and c) an enlarged partial view of a cam in the direction indicated by Y;

FIG. 2 shows a spanner with three cams as a) a top view and b) a side view;

DETAILED DESCRIPTION OF THE INVENTION

Figure 3:
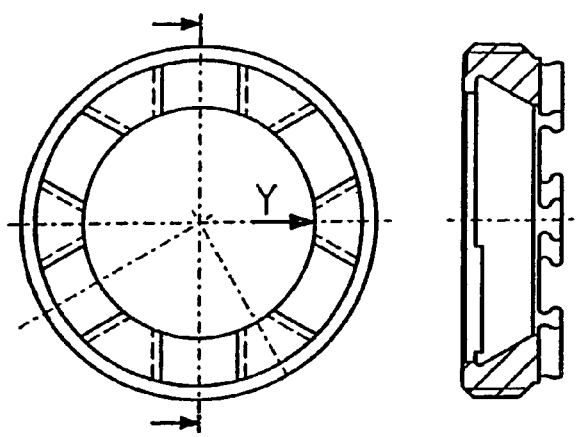
FIGS. 3-6 show alternative forms of the cam arrangement in tension nuts, in each case as a top view and a section.

As is known from conventional tension nuts, the tension nut 1, shown in FIG. 1a as an axial top view and in FIG. 1b as a section along the line A-A, has an inner cone 2 for the centred gripping of a collet chuck and a thread 3 for screwing into the holding fixture of a machine tool spindle or into a tool holding fixture.

Arranged on the face of the tension nut 1 are six axially protruding cams 4. The cams have a flat surface 5, which in axial top view has the shape of a quadrilateral with curved edges, and four side flanks 6, 7, 8, 9. The radially inner and outer side flanks 6, 7 have a cylindrical curvature according to the corresponding radius of the tension nut. The other two side flanks 8, 9 are symmetrical relative to the mid-planes 11 of the cams, defined by the axis 10 of the tension nut, and, as is clearly visible from the enlarged cut-out of FIG. 1b, have an S-shaped profile which tangentially adjoins the surfaces 5 and the face of the tension nut. The profile consists of two surfaces curved in opposite directions, which fit together homogeneously, i.e. without a break. In the present case the radius of curvature of the upper, convex surface is somewhat smaller than that of the lower, concave surface. However, the converse relationship can apply or the radii of curvature can be equal.

As in this example, either the two curvatures of the profile can mate directly or there can be a narrow flat intermediate region between the curved surfaces.

The cams 4 are uniformly distributed over the face of the tension nut 1, i.e. they have a mutual angular offset of 60°.

Depending on the width of the cams 4 in the direction of rotation, or the ratio of the width of the cams to the width of the gaps 12 between the cams, the latter could also be defined as grooves in an annular collar protruding axially from the tension nut. In this case the grooves in which the spanner engages would have side flanks of S-shaped profile.

The spanner 13, shown as a front view in FIG. 2a and as a side view in FIG. 2b, has a head 14 and a handle 15. The head is in the shape of an approx 270° annular segment. As is conventional for spanners, there is an angular offset of 15° between the head and the handle. A different angular offset or a symmetrical arrangement would also be possible. Arranged at both ends and in the middle of the annular segment are cams 16, 17, 18 protruding axially on both sides, which, when the spanner is inserted, engage in the S-shaped side flanks 8 or 9 of the tension nut cams 4. The side flanks of the spanner cams, which engage in the side flanks of the tension nut cams, have a corresponding S-shaped profile.

Figure 4:
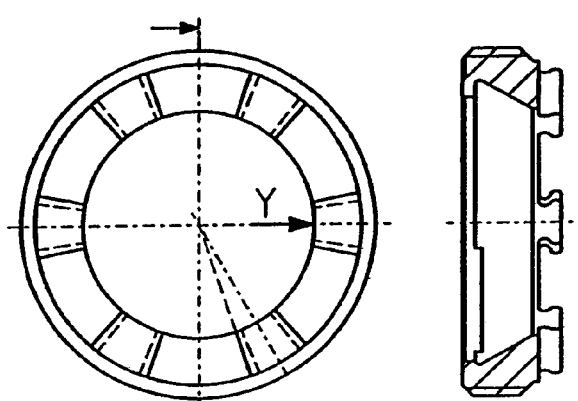
Figure 5:
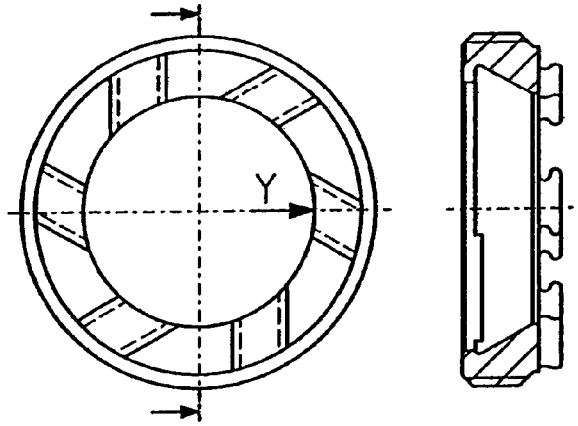
Figure 6:
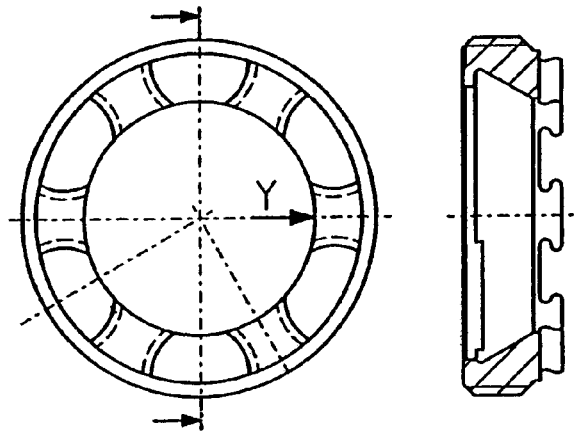

In the embodiment of a tension nut shown in FIG. 1, in addition to having the S-shaped curvature, the side flanks of the cams 4 also have a convex curvature facing away from the mid-plane 11 in the radial direction. Other embodiments, shown in FIGS. 3 and 4, have no curvature in the radial direction. In the embodiment of FIG. 3 the side flanks that each delimit a gap 12 are mutually parallel, while in the embodiment of FIG. 4 all the S-shaped side flanks are in a radial arrangement, i.e. directed towards the centre. In another embodiment, shown in FIG. 5, the side flanks that each delimit a gap 12 are parallel, while the mid-planes of the grooves do not run through the axis of the tension nut but are laterally offset relative to said axis. Finally, in another embodiment, shown in FIG. 6, in addition to having the S-shaped curvature, the side flanks of the cams 4 have a concave curvature facing towards the mid-plane 11 in the radial direction.

Of course, the number of cams per nut can also be other than six, but it is preferably three, six, nine, twelve, etc.

Figure 7:
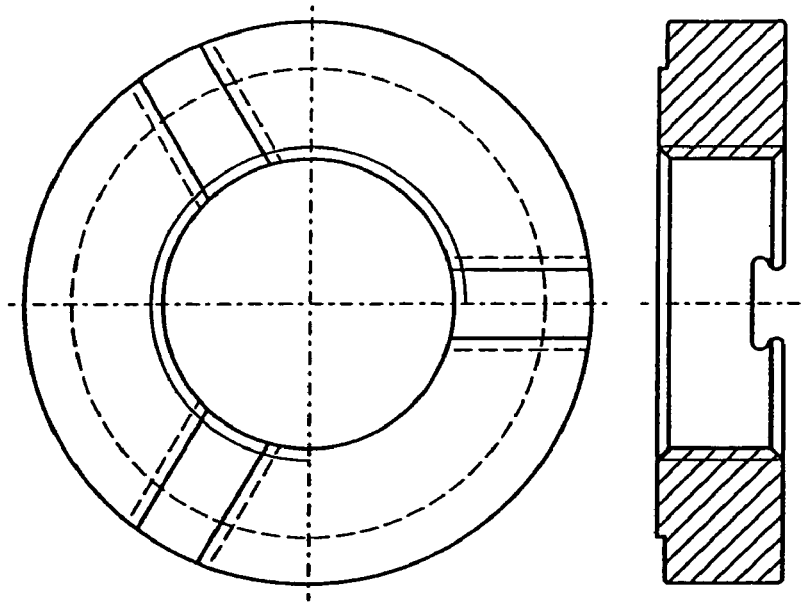
FIGS. 7-9 show various embodiments of nuts.
Figure 8:
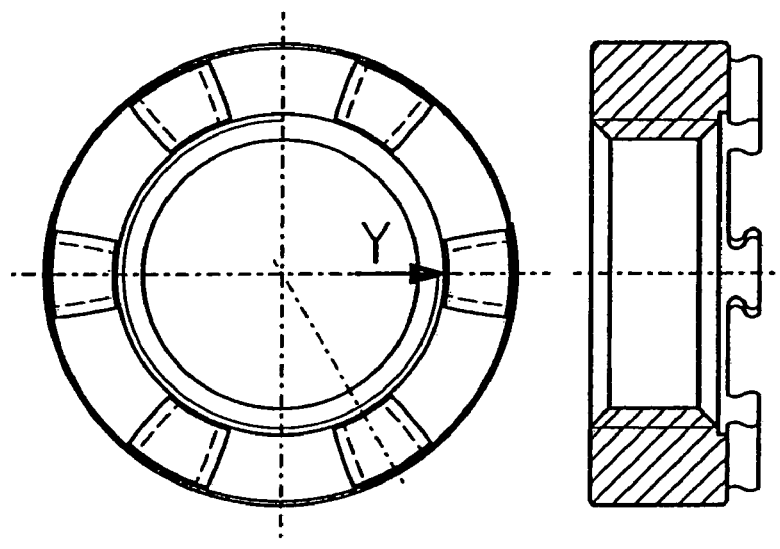
Figure 9:
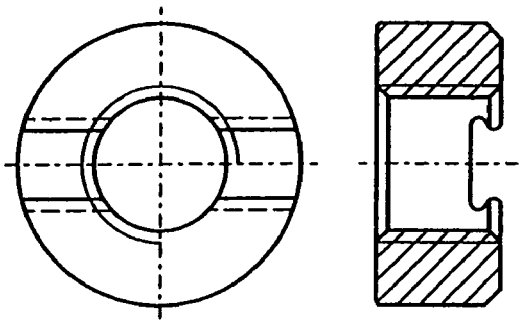

The clamping principle demonstrated above for tension nuts is also suitable for internally threaded nuts. Some embodiments are shown in FIGS. 7-9. These nuts have a cylindrical outer surface. The embodiment shown in FIG. 7 has three grooves uniformly distributed over its face, the side flanks of said grooves having an S-shaped profile. The embodiment of FIG. 8 is essentially a type of castellated nut in which the cams serve not only to tighten and loosen the nut but also to secure it. The embodiment of FIG. 9 has a slot-shaped through-groove with side flanks of S-shaped profile.

Figure 10:
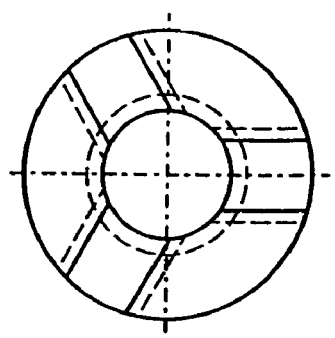
FIGS. 10-11 show embodiments of screws.
Figure 10:
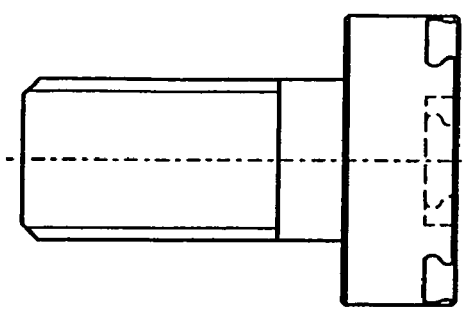
Figure 11:
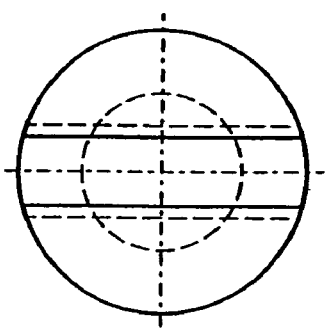
Figure 11:
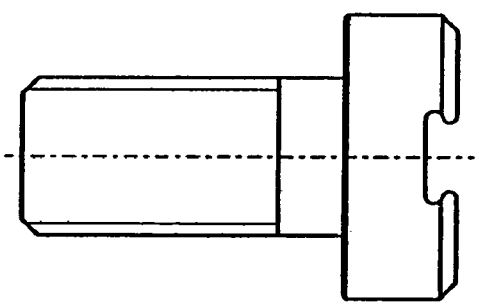

Screws can similarly be provided with grooves of S-shaped profile. FIG. 10 shows a screw in whose head three grooves are arranged with a mutual offset of 120°, the flanks of said grooves also having an S-shaped profile. FIG. 11 shows an embodiment with a through-groove whose flanks have an S-shaped profile.

Closure elements, such as covers, lids etc., also frequently suffer from the problem of requiring high torques to tighten or loosen them, and the risk of injury if the spanner slips can be correspondingly high. The principle of grooves or cams of S-shaped profile is suitable for these elements as well.

These shapes of nuts and corresponding spanners have a number of advantages over conventional shapes. They are safe for the operators because there are no sharp edges on which pieces of clothing can get caught or injuries can occur. The strength of the cams on nuts and spanners is greater than in the case of the dovetail shape because there is no notch effect due to the radii. Also, the non-slip property is better than with the dovetail shape because of the larger angle of the undercut. As the cams are not arranged in the threaded region of the nuts, damage to the thread is avoided. Finally, the upper radius of the side flanks facilitates the insertion of the spanner.

The invention claimed is:

1. A clamping device comprising: a screw element having a thread about an axis and faces extending perpendicularly to the axis, one face of the screw element including cams and grooves having side flanks extending radially about the axis, the side flanks having S-shaped profiles; and a spanner including corresponding cams and grooves having S-shaped profile to removably mate with the cams and grooves of the screw element to provide tightening and loosening of the screw element.

2. The clamping device according to claim 1, wherein the side flanks are additionally provided with concave or convex curvatures along their radial extension.

3. The clamping device according to claim 1, wherein the number of cams and grooves is a multiple of three.

4. The clamping device according to claim 1, wherein the screw element is a screw.

5. The clamping device according to claim 1, wherein the screw element is a nut.

6. The clamping device according to claim 1, wherein the screw element is a tensioning nut for fixing tools in a tool holder by means of a collet chuck.

7. The clamping device according to claim 1, wherein the screw element is a screw cap or stopper.

* * * * *